INVENTOR.
WAYNE R. JOHNSON
BY
Lippincott & Smith
ATTORNEYS

Oct. 20, 1959 W. R. JOHNSON 2,909,597

AMPLIFIER FOR TELEVISION SIGNALS

Filed Dec. 5, 1955 2 Sheets-Sheet 2

INVENTOR.
WAYNE R. JOHNSON
BY
Lippincott & Smith
ATTORNEYS

United States Patent Office 2,909,597

Patented Oct. 20, 1959

2,909,597

AMPLIFIER FOR TELEVISION SIGNALS

Wayne R. Johnson, Los Angeles, Calif., assignor, by mesne assignments, to Minnesota Mining & Manufacturing Co., St. Paul, Minn., a corporation of Delaware Application December 5, 1955, Serial No. 550,895

12 Claims. (Cl. 178—6.6)

This invention relates to amplifiers incorporating automatic gain control. Particularly it relates to amplifiers for television signals or others of like type where signals of varying amplitudes are periodically interspersed with pulses representative of the maximum amplitudes to be transmitted. Such signals may be, for example, the blanking or synchronizing signals transmitted at the end of each line of a television picture, but preferably, when the amplifier of the present invention is used as a portion of playback apparatus for reproducing, magnetically or otherwise, television signals, in recording such signals there are interspersed in the blanking intervals at the end of each line pulses which are representative, respectively, of the black level or zero illumination of the picture field and of a maximum or white level which corresponds to the maximum deviation from the black level permissible without overloading some portion of the system which the amplifier supplies.

Among the objects of the present invention are the following:

(*a*) To provide an amplifier which will maintain its output at substantially constant level irrespective of sensitivity variations due to defects or wear of recording mediums;

(*b*) To provide an amplifier for playback of recorded television signals which will maintain its output, as considered between positive and negative voltage swings, at a substantially constant level;

(*c*) To provide an amplifier which can be preset to define the signal amplitude representative of the maximum contrast attainable without overload of the following equipment and which will maintain contrasts of lesser value in proper relative proportions;

(*d*) To provide an amplifier for television and like signals which can be preset to operate within a definite range of output voltage on signals representing zero illumination and maximum illumination respectively, thereby positively preventing overloading of transmission lines or television transmitters carrying the reproduced signals;

(*e*) To provide a gain-controlled amplifier for television and like signals wherein the amplification is substantially linear irrespective of the amplifier gain;

(*f*) To provide a gain-controlled amplifier capable of maintaining a substantially constant output, within extremely narrow tolerances, which will not only maintain this constant output level over an unusually wide variation in input level, but which will, in the event of a complete dropout of input signals, due to defects in the recording medium, develop a signal corresponding to the average level of illumination, rather than a dark or bright streak, and (*g*) To provide an amplifier which will suppress spurious pulses developed in a method of low frequency compensation as described and claimed in a concurrently filed application entitled "Method of Recording and Reproducing Television Signals," Serial No. 550,894.

As has been indicated above, the amplifier of the present invention is primarily adapted to operate on television or radar signals, wherein the "message" or "picture" frequencies are periodically interspersed with blanking signals, transmitted during the flyback period of a scanning beam, and representative in amplitude of zero level of illumination or reflection of the signals to be reproduced. The purpose of the invention is to maintain the output of the amplifier constant with respect to a reference level. This reference level may, in certain instances, be the amplitude of the blanking signals with respect to the zero axis of the A.C. components of the signal as a whole. Where the amplifier is used to reproduce magnetically, or otherwise recorded television signals, however, there are preferably inserted in the recorded signals during the period of the blanking pulses a signal representative of the maximum "white" level, in which case the preferred reference level is the maximum amplitude signal, black or white, and control is exercised to maintain the total swing, from black to white, at substantially constant value. Obviously, in this case, the reference may also be taken at the average or zero axis level and the amplitude of either black or white be used for control. Which reference level is used, from which maximum amplitude is derived, depends upon other factors in the system, such as whether overload of some element is most likely to occur because of an excessive instantaneous peak and whether that peak is likely to result from a positive or negative swing, or whether overload would be more likely to result from an excess in average power.

In general terms the invention comprises an amplifier whose gain can be varied by the application of a control potential. Various such amplifiers are known, but preferably that employed in the present invention comprises a vacuum tube which includes means for generating a beam of electrons, a control element for varying the intensity of the beam, a pair of anodes between which the beam is divided, and a deflection system to which the input circuit to the amplifier is connected and which deflects the beam toward one or the other of the two anodes in accordance with the instantaneous polarity of the incoming signals. A tube of this character is commercially obtainable and is identified by the code numbers "6 AR 8." In case such an amplifier is used the output from the two anodes is connected to a differential amplifier to provide an output which is proportional to the difference between the voltages developed on the two anodes of the deflection-type amplifier. The output of the differential amplifier constitutes the usable signal. Connected to this output, however, is a feedback loop which includes, first, means for establishing the reference level against which the output signal is to be compared. If the reference signal is the A.C. axis such means can consist of a condenser for removing the D.C. component in the output of the differential amplifier (or the gain-controlled amplifier of whatever type is used) plus a leak resistor for biasing the output side of the condenser to ground potential, but in the case where the device is used to control the total range from black to white of the output signal it also includes a D.C. restorer which sets the reference level at the peak of the negative swing. This swing may, of course, be either representative of the white or the black level, depending upon the polarity at which the signal is supplied to the feedback loop. From the reference-setting means the signal is next applied to what is essentially a biased peak-detector. This comprises a rectifier connected to pass negative signals to an integrating condenser and charge it to the peak value of such signals, but there is also provided means for supplying to this condenser and the detector or rectifier a bias voltage equal in value to the desired maximum negative swing of the signal to be controlled, with the result that only voltages in excess of the desired value pass the rectifier and add to the charge on the integrating condenser. Preferably there is also included in the circuit, between the biased rectifier and the integrating condenser, an electronic switch which is normally open but which closes during the instant of the controlling pulses.

From the condenser a lead connects to the control circuit of the variable gain amplifier; in the preferred embodiment of the invention this is the control grid of the deflection-type amplifier, and the control is exercised by varying the intensity of the beam and therefore the number of electrons to be divided between the two anodes. In the normal procedure of operating the apparatus of the invention the operating parameters are so chosen that the amplifier is capable of developing signals of a level greatly in excess of that normally required when supplied with normal input signals, so that without a negative bias in the control circuit the system would be greatly overloaded. The effective gain around the feedback loop is very high and the mutual conductance of the amplifier tube, in terms of voltage on the control grid versus beam intensity, results in a very large variation in effective amplification for very small variation in voltage on the control grid. Accordingly the total swing of the output signal remains substantially constant at the value of the bias on the peak detector or rectifier circuit.

Finally, there is preferably included a clamp circuit, which, operated by a pulse timed in relation with that which operates the electronic switch, effectively resets the zero axis of the A.C. components of the amplified signals and thus both shorts out spurious pulses developed in the recording method of the concurrently filed application referred to above and, in the case of total drop-outs in recording, gives a line of average illumination instead of a light or dark streak across the picture.

The more detailed description of the invention, in various modifications, which follows is illustrated by the accompanying drawings, wherein.

Figure 1:
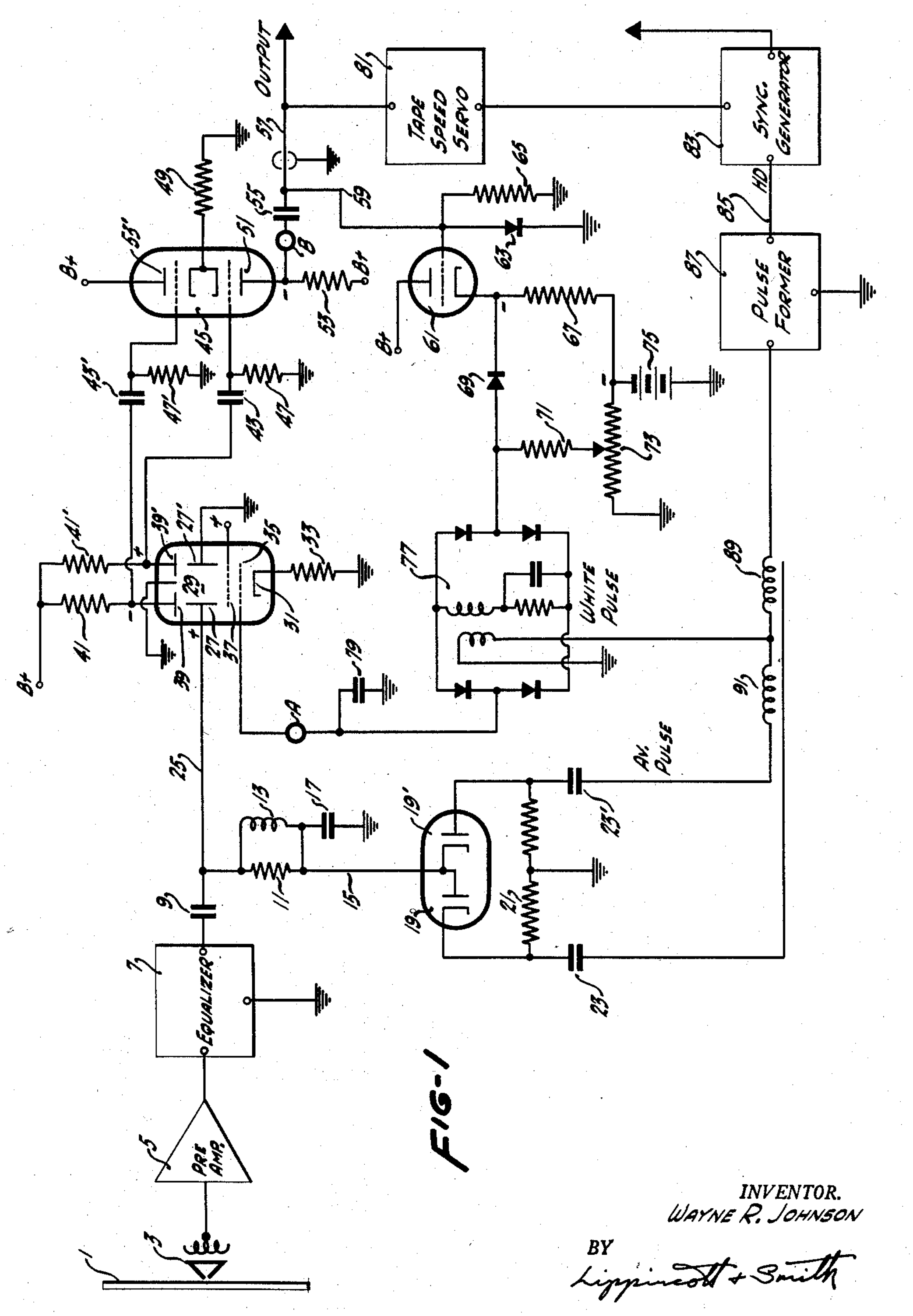
Fig. 1 is a schematic diagram of a preferred form of the invention as incorporated in a playback system for magnetically recorded television signals, those portions of the equipment not directly pertinent to the invention being shown in block form, the form shown in this figure being adapted to control the total amplitude of the output signal, from black to white.

Fig. 1 illustrates the preferred and, generally, the most useful form of the device, wherein the output signal is measured against and controlled by the total variation, from positive to negative, of the signal voltage. In this figure is represented a magnetic tape 1 which is moved, at a substantially constant speed, past a pickup transducer head 3 of conventional form, which translates the variations in magnetization of the tape into electrical waves. The signals as picked up by the head receive an initial amplification in preamplifier 5 and the relative magnitudes of the components of the various frequencies in the band occupied by the signals are adjusted by an equalizer 7. So far as the present invention is concerned the elements thus far described may be conventional, and hence they are shown in block form, with single-lead connections. Beyond this point the elements are shown schematically and as complete circuits, with the exception of certain post-amplifier apparatus which will be mentioned specifically later.

Figure 3:
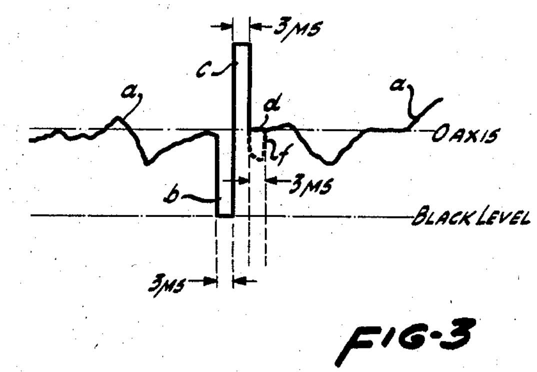
Fig. 3 illustrates the form of control pulse utilized in recording signals for reproduction by the apparatus illustrated in Fig. 1.

The apparatus shown is intended to operate on pulses having a waveform of the type generally illustrated in Fig. 3. Present standards of television transmission provide for blanking and synchronizing pulses interspersed with the picture-frequency signals at the end of each horizontal scanning line, or every 63.5 microseconds, the blanking period being 14% of the period of the line frequency, or 9 microseconds, very nearly. In recording signals of this character for reproduction on the equipment of the present invention, the synchronizing signals, of "blacker than black" level are clipped out and in the blanking period, starting approximately 3 microseconds after its initiation, there is inserted first a 3-microsecond pulse whose amplitude is relatively proportional to the maximum desired white level, followed by a 3-microsecond interval during which the A.C. component of the signal is effectively grounded and returned to its zero axis. In this interval there will, in general, be generated a spurious pulse, containing frequency components not present in the original signals, but which are eliminated by similarly grounding the playback signal circuit during the corresponding 3 microsecond interval, which resets the zero axis of the reproduced signal without regard to the sign or magnitude of the spurious pulse. The spurious pulses may be either positive or negative in sign and will vary in magnitude with the nature of the picture being reproduced, but since they result from resetting the A.C. components of recording output to zero or average level and the 3 microsecond interval in which they occur appears in the signal as played back at average level it is convenient to refer to such pulses, in both recording and playback, as "average level pulses."

Reverting from this explanation to Fig. 1, the output of the equalizer 7 connects through a blocking condenser 9 of sufficient capacity to offer negligible impedance to the picture signals. Immediately beyond the condenser there is connected a clamp circuit, which is operated in response to an actuating pulse to establish the mean potential of the output side of condenser 9 at ground level, and thus suppress any spurious pulses developed in recording, symbolized by the dotted pulse *f* of Fig. 3 and establish the zero axis of the output wave at *d* in the same figure. The clamp circuit is conventional with one exception; i.e., a low-pass filter, comprising a resistor 11 in parallel with an inductor 13 is connected in the lead 15 to the clamp, with a condenser 17 connected from the clamp side of the resistor and inductor to ground. The clamp itself comprises a pair of diodes, 19, 19' connected in series with the lead 15 connected to their junction, between the anode of diode 19 and the cathode of diode 19'. A resistor 21 connects in parallel with the series-connected diodes, the center point of the resistor being grounded. A pulse which operates the clamp is applied across the resistor and the diodes through a pair of blocking condensers, 23, 23', this pulse being developed as will be described hereinafter. The low-pass filter circuit insures that the clamp will not take effect at an improper level, due to the clamping action occurring on a positive or negative peak of noise, such peaks occurring at random as a result of irregularities in the tape or thermal noise developed in the preceding apparatus.

Beyond the clamp thus described signal lead 25 connects to one deflecting plate 27 of the deflection-type amplifier tube generally indicated by the reference character 29, the second deflecting plate 27′ being connected to ground so that the average potential of the two plates is the same and in the absence of signal a beam of electrons passing between them will be undeflected. The tube 29 includes an electron-emissive cathode 31 which is grounded through a conventional biasing resistor 33. Electrons emitted from the cathode pass first through a control grid 35 and then between deflecting plates 27, 27′, to divide between a pair of anodes, 39, 39′. Each anode connects through an output resistor, 41, 41′ to a source of anode potential, not shown, but indicated as B+.

Leads connect from the anodes 39, 39′, respectively, through blocking condensers 43, 43′ to the control grids of a differential amplifier, which may comprise a dual tube 45. The two grids are biased through conventional grid resistors 47, 47′. The cathodes of the two tubes connect through a common resistor 49 to ground. One anode, 51, connects through a load resistor 53 to B+, the other anode 51′ connecting to B+ directly.

This differential amplifier is one of several forms which are well known in the art, any one of which is suitable for the purpose here described. These amplifiers have, in general, the advantage of a high degree of linearity, and are of advantage in converting a balanced circuit into a single-ended circuit. In the present case the useful output of the amplifier is taken off across a load resistor 53, which connects through a blocking condenser 55 to a coaxial line 57 and thence, after blanking and synchronizing pulses have been reinserted to a transmission line or radio transmitter.

A feedback loop is taken off from the output circuit immediately following the condenser 55. Tracing this loop, a branch lead 59 connects to the grid of a cathode follower triode 61. A D.C. restorer, comprising a rectifier 63 in parallel with a high value resistor 65, connects between condenser 55 and the grid of the cathode follower tube. This D.C. restorer is of conventional type; the rectifier is so poled that a positive pulse passing through the condenser is effectively grounded, so that at the maximum positive swing of the output signals the condenser 55 assumes substantially ground potential. This leaves a negative charge on condenser 55 of the maximum value of the positive swing, to insure that the average value or zero axis of the alternating components is properly related to the black level, it being noted that at this point in the circuit the signal is inverted, black being positive. The time constant of the condenser 55 and resistor 65 is made relatively large in comparison to the 63.5 microsecond interval between blanking pulses so that there is little change in the level of the grid potential of tube 61 between successive pulses.

Cathode resistor 67 of the tube 61 is made relatively high in comparison with the output impedance of the tube, so that the amplification constant of the tube approaches unity very closely. A rectifier 69 connects to the cathode resistor, poled so as to pass negative pulses. Immediately beyond the rectifier there is connected a biasing circuit, comprising a resistor 71 connected to the movable contact of a potentiometer 73, one end of which connects to ground and the other to the negative terminal of a suitable biasing source 75, the other or positive terminal of which is grounded. By setting this potentiometer the mniimum value of negative pulse which will pass through the rectifier 69 can be adjusted.

Beyond the biasing circuit the pulses passed by the rectifier 69 pass to a conventional electronic switch 77, and thence to an integrating condenser 79. Condenser 79 is small enough, and the impedance of the circuit supplying it from tube 61 is sufficiently low and has adequate power output so that condenser 79 can charge to the full value of the negative pulses in the intervals when the switch 77 is closed. This is during the white level pulses *c* (Fig. 3) of the input signals. Grid 35 of amplifier tube 29 connects to the high voltage terminal of condenser 79, and controls the intensity of the electron beam in accordance with the value of the voltage across the condenser.

The impedance of the electron switch 77 when open is so high that in the intervals between the pulses which close the switch, condenser 79 is practically isolated and holds its charge unchanged. The time constant of the circuit comprising condenser 79 and resistor 71 is, however, short in comparison with the pulse length, so that if the amplitude of the pulses drops below the value of the bias on the rectifier 69, the condenser 79 discharges down to the point where condenser potential and the pulse potential equalize and the amplitude of the signal is therefore reset at the end of each line of the picture.

Pulses for operating the clamp which sets the A.C. axis and the electronic switch 77 may be developed in several ways. It is known in the art that the repetition frequency of the blanking pulses may be used to regulate the speed of the motors which drive the tape and to lock the tape speed in with a standard synchronizing generator of the type used to develop the horizontal and vertical drive pulses for operating television cameras and for synchronizing receivers. A tape speed servo-system of this character is indicated at the reference character 81, taking off as a branch circuit from the output lead 57. This supplies a frequency which ties in with the synchronizing generator 83 of conventional type. A lead 85 is taken off from the horizontal-drive connection of the sync generator and supplied to a pulse former 87. This may be a mono-stable or "one-shot" multivibrator, triggered by the leading edge of the horizontal drive pulse and timed to develop a pulse of 3 microseconds. This last-mentioned pulse is passed through a delay line 89 which delays it for 3 microseconds, at which time it arrives at the switch 77 to close it during the interval of the "white pulse" *c* of Fig. 3. It then passes through a second 3-microsecond delay line 91 and thence it triggers the clamp comprising the double diode 19, 19′, to clamp the input of the amplifier on the zero axis during the "pulse" *d* of Fig. 3.

Figure 4:
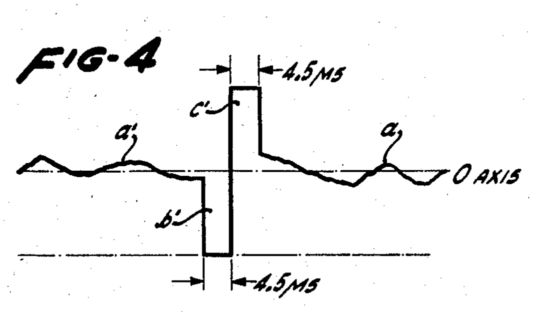
Fig. 4 illustrates a modified form of control signal.

Resetting of the zero axis is necessary in some, but not all, systems of television recording and reproduction. If a recording system is used where such resetting is not necessary the waveform during the blanking intervals may be that shown in Fig. 4, where the black level is set by pulse *b′* of 4.5 microseconds and the white level is set by a pulse *c′*, also approximately 4.5 microseconds, the zero axis *d* being omitted entirely. In this case the delay line 89 is designed to develop a 4.5 microsecond delay and the delay line 91 is omitted altogether, the entire clamp mechanism being replaced by a simple leak resistor.

Where the waveforms of either Fig. 3 or Fig. 4 are used in the recording process, the pulses *c* and *d* or *c′* are gated out and the synchronizing and blanking pulses are reinserted from the sync generator 83.

The above description has been based on the assumption that the white pulse *c* (or *c′*) as supplied to the lead 25 is of positive polarity. If the polarity of the signals as supplied to lead is reversed it should be clear that it is only necessary to reverse the connections to the two grids of the tube 45 from the anodes of the tube 29 in order to make the remainder of the circuit operate as described. The plus and minus signs shown at the take-offs of the various circuits indicate the polarity of the white pulses as they appear at these points.

It should also be evident that since it is the total swing of the output signal which is important in setting its level, the zero axis can be set against the positive swing instead of the negative and the black level pulse used as the controlling pulse instead of the white level. If the pulses are inserted in the same order shown this would involve the connection of the actuating circuit for the switch 77 ahead of the delay line 89 instead of behind it. The pulses can, of course, be inserted in different orders, with corresponding changes in the order of the switching and clamping pulses.

Figure 2:
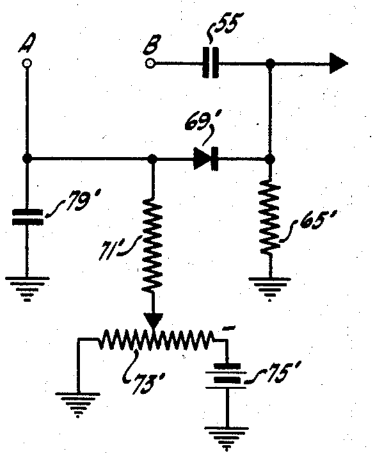
Fig. 2 illustrates a modified form of the feedback loop applicable when the reference used is the zero axis and the swing in one direction only is used for output control.
Figure 5:
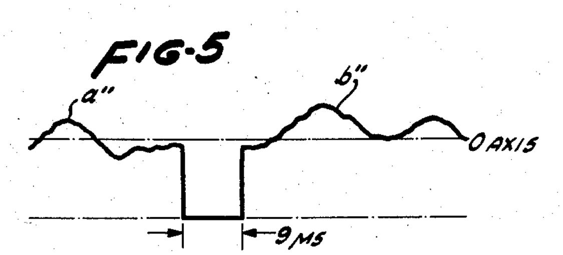
Fig. 5 illustrates a third type of control pulse which may be used when amplitude in one direction only is employed for control purposes.

As was mentioned above, the general purposes of the invention can be accomplished in a somewhat less satisfactory manner by using unidirectional pulses only. For television purposes this would be used only in special circumstances, where the average illumination level was substantially constant, as, for example, in the case of television monitoring of an industrial process where the field of view is substantially unchanging. In this case the white pulse would not be transmitted, the waveform being as shown in Fig. 5, only the 9-microsecond blanking pulse being recorded. In this instance the clamp circuit from the lead 25 to ground would be replaced by a leak resistor and the feedback loop, between the terminals A and B could take the very simple form shown in Fig. 2. In this circuit the condenser 55 is biased to zero axis level through a leak resistor 65' instead of to black or white level, as the case may be, by the D.C. restorer. The cathode follower tube 61 of Fig. 1 can be omitted entirely, and the peak detector 69' connected directly. The biasing circuit including the resistor 71', the potentiometer 73' and biasing source 75' are, with one exception, substantially identical with those of Fig. 1, the exception being that the time constant of resistor 71 and the integrating condenser 79' is made relatively long, since the electronic switch 77 is omitted. As stated this form of control is neither as positive in its control or as rapid in action as the form shown in Fig. 1 and it is therefore shown primarily for completeness, since the saving in equipment may, in certain instances, counterbalance the disadvantages of the simplified circuit.

Several modifications of the circuit shown have been suggested and various others will occur to those skilled in the art. The example particularly described is therefore not intended as limiting the scope of the invention, all intended limitations being specifically set forth in the claims which follow.

What is claimed is:

1. Playback apparatus for reproducing television and like signals comprising a band of varying frequency and amplitude interspersed in recording with periodically recurring pulses of the maximum amplitude of the signals to be reproduced, comprising the combination with a transducing head for translating the recorded signals into electric waves, of an amplifier the gain whereof is variable in response to a control voltage connected to respond to signals translated by said transducing head, a source of voltage of a value equal to the maximum permissible amplitude of the reproduced signals, a clipping circuit supplied by said amplifier for balancing the voltage of said source against the instantaneous voltage of the reproduced signals so as to pass current only when the amplitude of said signals exceeds the voltage of said source, switching means actuated simultaneously with said recurring pulses connected to pass current from said clipping circuit only during said pulses, a condenser connected to be charged by current through said switching means and thereby develop an error voltage proportional to the difference between the voltages of said current and said source, and means actuated by said error voltage for controlling the gain of said amplifier.

2. Playback apparatus for reproducing television and like signals comprising a band of varying frequency and amplitude interspersed in recording with periodically recurring pulses of the maximum amplitude of the signals to be reproduced, comprising the combination with a transducing head for translating the recorded signals into electric waves, of an amplifier the gain whereof is variable in response to a control voltage connected to respond to signals translated by said transducing head, a D.C. restorer connected to the output of said amplifier to render the resulting signals unidirectional, a source of comparison voltage substantially equal to the permissible maximum amplitude of said unidirectional signals, a rectifier connected to pass said signals and biased by said source to pass only such portions of said signals as exceed the voltage of said source, a condenser connected to be charged by the portions so passed and thereby develop an error voltage, switching means interposed between said rectifier and said condenser operative to connect said rectifier and said condenser only during said pulses, and connections for applying the error voltage developed by the charged condenser to control the gain of said amplifier.

3. Playback apparatus for recorded television signals comprising picture frequencies periodically interspersed with a group of pulses representative in amplitude respectively of zero illumination and maximum permissible amplitude of signals to be transmitted comprising an amplifier the gain whereof is variable in response to a control voltage adapted for connection to apparatus for translating recorded signals into electric waves and having a feedback loop connecting from the output to the input of said amplifier, a rectifier included in said feedback loop to pass signals therein in one direction only, a source of direct potential substantially equal to the permissible difference between the maximum negative and positive output signal voltages of said amplifier connected to bias said rectifier so as to prevent passage of signal current therethrough as a result of signal voltages less than the voltage of said source, a condenser connected to be charged by current through said rectifier, and connections from said condenser for applying the potential thereacross as a control voltage to reduce the gain of said amplifier.

4. Playback apparatus for recorded television signals comprising picture frequencies periodically interspersed with a group of pulses representative in amplitude respectively of zero illumination and maximum permissible amplitude of signals to be transmitted comprising an amplifier the gain whereof is variable in response to a control voltage adapted for connection to apparatus for translating recorded signals into electric waves and having a feedback loop connecting from the output to the input of said amplifier, a rectifier included in said feedback loop to pass signals therein in one direction only, a source of direct potential substantially equal to the permissible difference between the maximum negative and positive output signal voltages of said amplifier connected to bias said rectifier so as to prevent passage of signal current therethrough as a result of signal voltages less than the voltage of said source, a condenser connected to be charged by current through said rectifier, an electronic switch in said feedback loop, means operative in synchronism with the pulses representative of maximum permissible amplitude signals for operating said switch to complete the circuit of said loop only during the continuance of said last-mentioned pulses, and connections from said condenser for applying the potential thereacross as a control voltage to reduce the gain of said amplifier.

5. Playback apparatus for recorded television signals comprising picture frequencies periodically interspersed with a group of pulses representative in amplitude respectively of zero illumination and maximum permissible amplitude of signals to be transmitted comprising an amplifier the gain whereof is variable in response to a control voltage adapted for connection to apparatus for translating recorded signals into electric waves and having a feedback loop connecting from the output to the input of said amplifier, a buffer amplifier in said loop having a low output impedance in comparison to the impedance of the portion of said loop to which it is connected, a rectifier connected to the output of said buffer amplifier, means for biasing said rectifier to prevent the passage of signals of lower potential than said bias, a condenser connected to be charged by signals passed by said rectifier, and connections from said condenser for applying the potential thereacross as a control voltage to reduce the gain of said amplifier.

6. A gain-controlled amplifier for television and like signals of varying amplitude interspersed periodically with pulses representative of the maximum difference in potential of said signals from a reference voltage, comprising an amplifier the gain whereof is a direct function of the average current therethrough and including control means for varying said average current in response to a control voltage, and a feedback loop connecting from the output of said amplifier to said control means which includes, in succession, means for establishing the average voltage of said signals with respect to said reference level, a detector connected to pass said maximum pulses, means for biasing said detector by a substantially constant voltage to permit passage therethrough of only such portions of said pulses as exceed the voltage of said biasing means, a condenser connected to be charged by pulses passed by said detector, and connections for applying the voltage developed by the charge on said condenser to the control means of said amplifier in such sense as to decrease the average current through said amplifier.

7. A gain-controlled amplifier for television and like signals of varying amplitude interspersed periodically with pulses representative of the maximum difference in potential of said signals from a reference voltage, comprising an amplifier the gain whereof is a direct function of the average current therethrough and including control means for varying said average current in response to a control voltage, and a feedback loop connecting from the output of said amplifier to said control means which includes, in succession, a clamp circuit for establishing the maximum departure of said signals from the peak voltage of said pulses as a reference voltage, a rectifier connected to pass voltages of the polarity of said pulses, means for applying a substantially constant bias voltage to said detector in opposition to the voltage of said pulses to permit passage by said rectifier only of such portions of said pulses as exceed said bias voltage in value, a condenser connected to be charged by the portions of said pulses passed by said rectifier, and connections for applying said voltage resulting from the charge on said condenser to reduce the average current through said amplifier.

8. A gain-controlled amplifier for television and like signals of varying amplitude periodically interspersed with pulses representative of the maximum relative amplitude of the signals to be amplified, comprising an amplifier tube having means for producing a beam of electrons, a control grid for varying the intensity of said beam, a pair of anodes between which said beam divides and a signal input circuit comprising means for deflecting said beam predominantly to one or the other of said anodes; an impedance element connected to each of said anodes, a differential amplifier having input circuits connected between said anodes and a single output circuit, a D.C. restorer circuit connected in the output of said differential amplifier to render said signals unidirectional, a rectifier connected to pass such unidirectional signals, means for biasing said rectifier by a substantially constant voltage opposing the passage of said unidirectional signals, a condenser connected to be charged by signals passing said rectifier, and connections from said condenser for applying the voltage thereacross to bias the control grid of said amplifier tube relatively to said beam producing means in such sense as to reduce the intensity of said beam.

9. A gain-controlled amplifier for television and like signals of varying amplitude periodically interspersed with pulses representative of the maximum relative amplitude of the signals to be amplified, comprising an amplifier tube having means for producing a beam of electrons, a control grid for varying the intensity of said beam, a pair of anodes between which said beam divides and a signal input circuit comprising means for deflecting said beam predominantly to one or the other of said anodes; an impedance element connected to each of said anodes, a differential amplifier having input circuits connected between said anodes and a single output circuit, a D.C. restorer circuit connected in the output of said differential amplifier to render said signals unidirectional, a rectifier connected to pass such unidirectional signals, means for biasing said rectifier by a substantially constant voltage opposing the passage of said unidirectional signals, a condenser connected to be charged by signals passing said rectifier, connections from said condenser for applying the voltage thereacross to bias the control grid of said amplifier tube relatively to said beam producing means in such sense as to reduce the intensity of said beam, and switching means interposed between said rectifier and said condenser and timed with said pulses so as to charge said condenser only during said pulses.

10. A gain-controlled amplifier for television and like signals of varying amplitude periodically interspersed with pulses representative of the maximum relative amplitude of the signals to be amplified, comprising an amplifier tube having means for producing a beam of electrons, a control grid for varying the intensity of said beam, a pair of anodes between which said beam divides and a signal input circuit comprising means for deflecting said beam predominantly to one or the other of said anodes; an impedance element connected to each of said anodes, a differential amplifier having input circuits connected between said anodes and a single output circuit a cathode-follower amplifier having an input circuit connected to the output circuit of said differential amplifier, a D.C. restorer circuit connected across the input circuit of said cathode follower to render the signals applied thereto unidirectional, a rectifier connected to pass the unidirectional signals from the output of said cathode-follower, means for applying a substantially fixed voltage to bias said rectifier to prevent passage by said rectifier of signals of lower amplitude than said bias voltage, a condenser connected to be charged by signals through said rectifier, and connections from said condenser to said beam-producing means and control grid to apply the voltage developed across said condenser as a result of charging through said rectifier to reduce the intensity of said beam.

11. Apparatus for translating electric signals having portions of variable amplitude interspersed with periodically recurring pulses of relatively uniform amplitudes, comprising input and output terminals, A.C. circuit means including a variable-gain amplifier connected between said input and output terminals for transmitting such signals therebetween, a D.C. restorer circuit connected to said output terminal for automatically setting one amplitude extreme of the periodically recurring pulses at a fixed voltage level, switching and integrating means connected to said output terminal and synchronized with such pulses for developing a control voltage related in value to the amplitude of the pulses, and connections between said switching and integrating means and said variable-gain amplifier for supplying the control voltage to the amplifier for automatically controlling the gain thereof to keep the amplitudes of such pulses substantially constant in value at said output terminal, whereby the signals provided at the output terminal are automatically corrected with respect to both signal amplitude and D.C. level.

12. Apparatus for translating electric signals having portions of variable amplitude interspersed with periodically recurring pulses of relatively uniform amplitudes, comprising variable-gain, A.C. amplifying means having input, output and gain-control terminals, said amplifying means transmitting signals between its input and output terminals with a variable signal-gain controlled by voltage supplied to its gain-control terminal, a D.C. restorer circuit connected to the output terminal of said amplifying means for setting the base of each such periodically recurring pulse at a fixed voltage level, a source of reference voltage equal to a desired voltage level of the peaks of such pulses, switching means connected to said output terminal and said source of reference voltage and synchronized with such pulses for transmitting error-signal pulses proportional in amplitude to the difference between the aforementioned peaks and the reference voltage, a capacitor connected to said switching means to be charged by the error-signal pulses to a voltage proportional to the aforementioned difference, and connections for supplying the last-mentioned voltage to the gain-control terminal of said amplifying means, whereby the signals provided at the output terminal are automatically corrected with respect to both signal amplitude and D.C. level.

References Cited in the file of this patent

UNITED STATES PATENTS

| | | |
|---|---|---|
| 2,307,375 | Blumlein | Jan. 5, 1943 |
| 2,792,496 | Rhodes | May 14, 1957 |

FOREIGN PATENTS

| | | |
|---|---|---|
| 713,931 | Great Britain | Aug. 18, 1954 |
| 733,360 | Great Britain | July 13, 1955 |